Jan. 24, 1967 R. J. KOERNER ETAL 3,300,766

ASSOCIATIVE MEMORY SELECTION DEVICE

Filed July 18, 1963 3 Sheets-Sheet 1

RALPH J. KOERNER
EDWARD J. SCHNEBERGER
INVENTORS

BY Arthur Froelich

ATTORNEY

INVENTORS
RALPH J. KOERNER
EDWARD J. SCHNEBERGER
BY Arthur Freilich
ATTORNEY

ASSOCIATIVE MEMORY SELECTION DEVICE

Filed July 18, 1963 3 Sheets-Sheet 3

RALPH J. KOERNER
EDWARD J. SCHNEBERGER
INVENTORS

BY Arthur Freilich

ATTORNEY

United States Patent Office 3,300,766

Patented Jan. 24, 1967

3,300,766

ASSOCIATIVE MEMORY SELECTION DEVICE

Ralph J. Koerner and Edward J. Schneberger, Los Angeles, Calif., assignors, by mesne assignments, to The Bunker-Ramo Corporation, Stamford, Ohio, a corporation of Delaware Filed July 18, 1963, Ser. No. 296,053

18 Claims. (Cl. 340—174)

Figure 1:
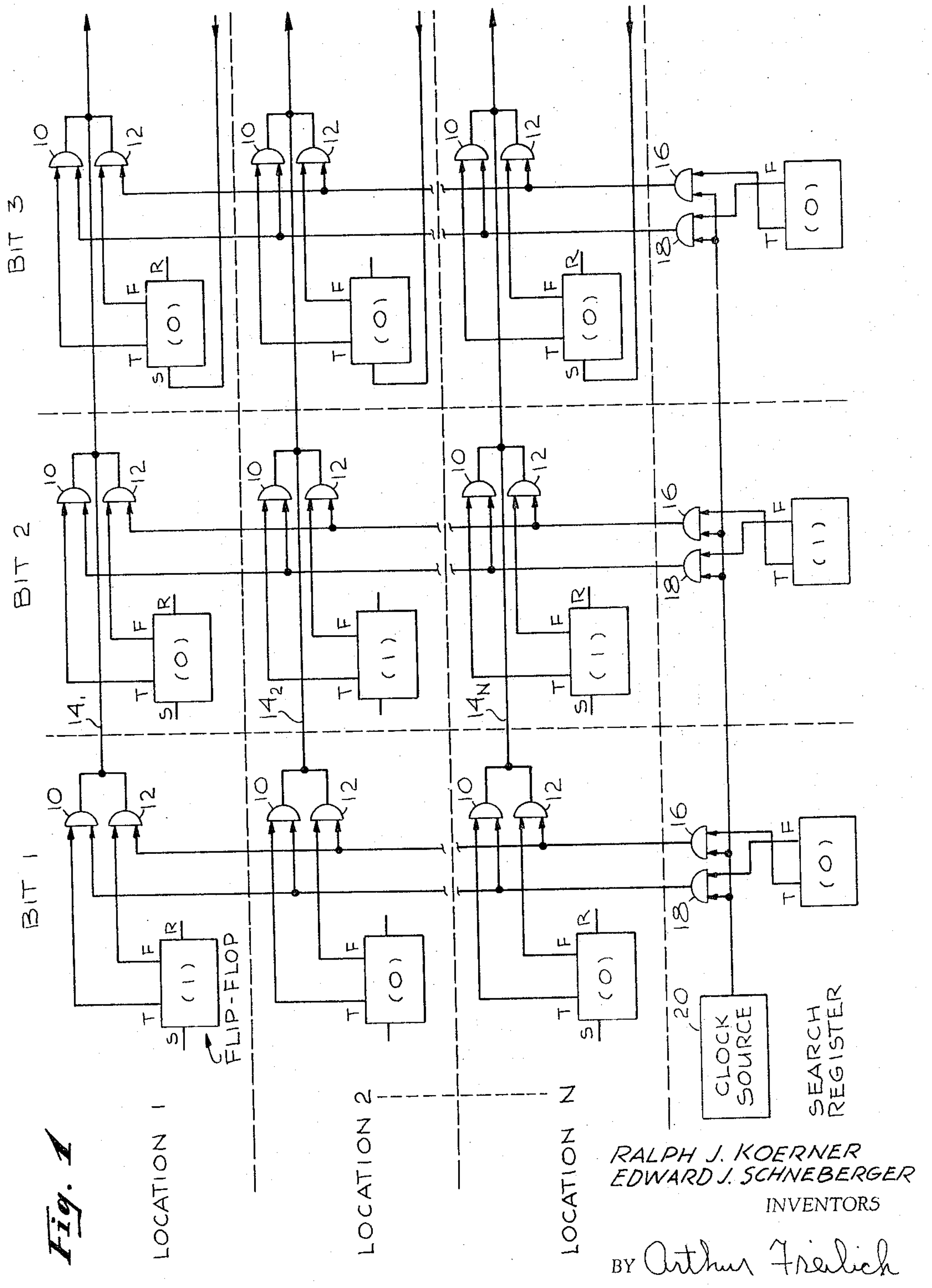

This invention relates generally to data processing apparatus and more particularly to a selection device for use with a plurality of binary elements, respectively arbitrarily numbered 1, 2 . . . N for seeking out and selecting the lowest numbered element in a given state and finds particular utility in monitoring a plurality of conductors.

For purposes of illustration and explanation, the invention herein will be described in connection with binary digital data processing apparatus but it is specifically pointed out that the term "binary" is used only in the sense that two different broad classes of manifestations are contemplated. For example, the two possible values of a binary manifestation can be respectively represented by the presence and absence of an electrical pulse but in addition the two values can be respectively represented by the presence and absence of an electrical pulse having predetermined and very precise characteristics.

In many diverse digital data processing systems, a bank of binary elements is provided with each element being connected to a different conductor so as to sense a binary signal therein, which can be manifested by the presence or absence of a pulse of a predetermined characteristic and can be representative of the occurrence or nonoccurrence of a different condition. The binary element can be made to assume a true state, for example, in response to the presence of said pulse. It is often desirable to be able to examine the respective states of the various elements at the end of a certain time interval in order to determine which elements were switched to the true state or alternatively which elements remained in the false state. Although straightforward commutation techniques can be used to sequentially sample each element, this procedure is often unnecessarily slow, particularly where the number of elements assuming the sought state is small compared to the total number of elements in the bank.

This latter situation often arises, for example, in the use of digital memories of the type disclosed in U.S. Patent No. 3,031,650 which can appropriately be considered a content addressable memory, inasmuch as its storage locations are addressed or selected on the basis of the contents stored therein rather than on the basis of some arbitrarily assigned address. Such a memory permits all of the memory storage locations to be simultaneously searched to determine whether any of the words stored therein are identical to a search word being sought. A different word line is associated with all of the storage elements of each storage location and for each bit of any stored word which mismatches the corresponding bit of the search word, a pulse is provided on the word line associated with the location containing the dissimilar bit (of course, in an alternative embodiment, pulses can be provided to represent a match situation). Each word line can have a different binary element connected thereto which can be switched to a true state in response to the presence of one or more pulses on the word line. At the end of a search period, it is desirable to examine all such binary elements to determine which ones, if any, remained in the false state. A binary element remaining in the false state would of course indicate that all of the bits stored in the associated storage location are respectively identical to the corresponding bits of the search word. In addition to merely determining which binary elements remained in the false state, it is sometimes desirable to make these determinations sequentially in order to permit this information to be conveniently utilized to subsequently read out, write in, or modify the same or other information in the same or another memory.

Inasmuch as the number (M) of binary elements remaining in the false state for most contemplated applications of a content addressable memory will be extremely small compared to the number (N) of binary elements which is switched to the true state, it is desirable to avoid the utilization of conventional time consuming commutation techniques to sequentially sample each of the elements.

In view of this, it is an object of the present invention to provide a selection device for use with a plurality of binary elements respectively arbitrarily numbered 1, 2, 3, . . . N for seeking out and selecting the lowest numbered element in a given state.

More particularly, it is an object of this invention to provide such a selection device which can select the lowest numbered element in a given state in the same finite time period regardless of which particular element is in fact the lowest numbered element in said given state.

It is a still further object of this invention to provide such a selection device which can sequentially select each of the M binary elements, of a total number of N binary elements, in a given state in M finite time periods regardless of which M elements are in said given state.

Briefly, the invention herein is based on the recognition that by generating a physical manifestation of an appropriate value for each binary element in a given state, and by incrementally developing a sum of all of such generated values, a unique one of said elements in said given state can be selected by applying each incremental step value of said sum as a biasing signal to a different one of a plurality of output circuits, each output circuit being uniquely associated with a different one of said binary elements, such that a unique response will be initiated only in the output circuit biased by a unique one of said incremental step values.

In a preferred embodiment of the invention, a plurality of magnetic cores, each capable of assuming either a first or a second remanent state, is employed as the plurality of binary elements. Each of the cores has a first winding threaded therethrough which is connected to a different one of the word lines in a content addressable memory. Consequently, the appearance of a pulse on a word line causes the magnetic core associated therewith to switch from its first to its second state of remanence.

In addition, each of the cores has a first and a second sense winding threaded therethrough. The first sense windings of all of the cores are connected in series in an additive manner. A plurality of taps is provided, each of which is connected to a corresponding terminal of a different first sense winding. Each of the taps in turn is connected to the base of a different one of a plurality of transistors, each transistor respectively forming a part of a different output circuit, each output circuit thereby being associated with a different one of the magnetic cores.

The second sense winding on each core is connected to the emitter of the same transistor to whose base the tap connected to the first sense winding on the same core is connected. A first drive winding is threaded through all of the cores and has connected thereto a pulse generator adapted to switch all of the cores from a first to a second remanent state. By causing the pulse generator to apply a pulse to the first drive winding at the end of a search period, only those cores which were not switched to the second remanent state by a pulse appearing on the respective word lines threaded through the cores will be switched. Consequently, pulses will be induced in the first and second sense windings in each core switched to the second state by the pulse produced by the pulse generator. The pulses induced in the respective second sense windings will attempt to drive current through the respective transistors to which the second sense windings are connected. However, since similar pulses constituting the previously mentioned physical manifestations of appropriate value are simultaneously induced in the first sense windings and since the first sense windings are connected in series to thereby develop multiples of the amplitude of the induced pulse at each tap other than the tap connected to the first sense winding in the series circuit, all of the transistors will be effectively back-biased except the transistor connected to the first sense winding which will be forward-biased. As a consequence, of course, current will be initiated only in the forward-biased transistor. This current can be utilized to select a particular word location in a second memory so as to permit information to be read out or written into that selected location. On the other hand the current can be utilized to read out or write in information into a particular location in the content addressable memory.

Alternatively or additionally, the current can be utilized to modify the contents of the location in the content addressable memory associated with the transistor in which current was initiated in order to purposefully make the contents different from the search word. By doing this, a subsequent search for the same search word will cause a current to be initiated in the output circuit associated with the next lowest numbered core remaining in the first state after a search period. It can be seen that by repeating this procedure M number of times, each of the M cores or bistable elements in the desired first state can be selected.

It is to be understood, of course, that although the invention finds particular utility in conjunction with content addressable memories, it can also be advantageously utilized for innumerable other purposes where a plurality of conductors, on which signals having predetermined characteristics may randomly appear, are to be monitored. For example only, the invention can be extremely useful when employed with a plurality of telephone lines, which are randomly and possibly simultaneously energized, for monitoring or answering service purposes.

Figure 2A:
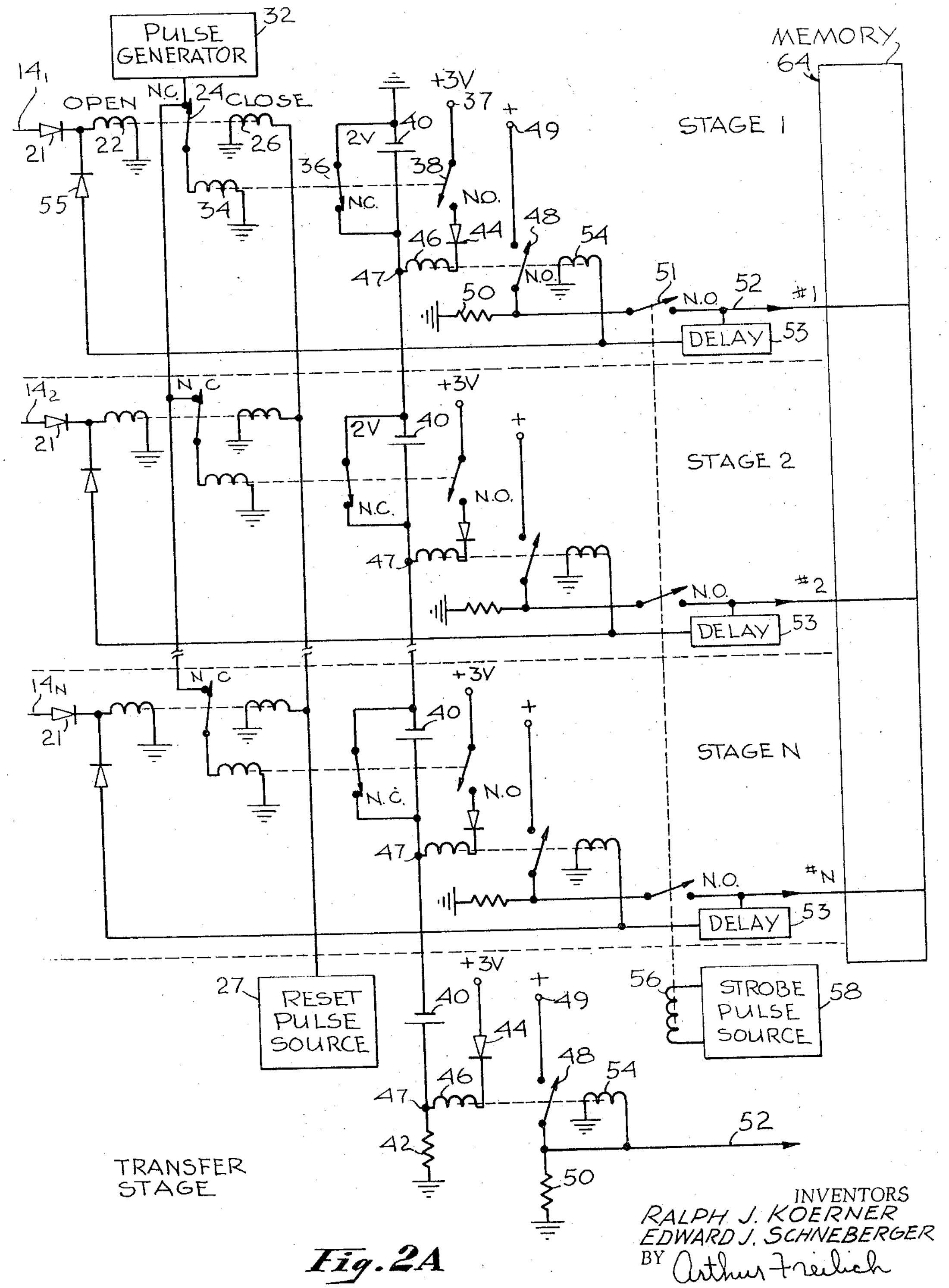
Figure 2B:
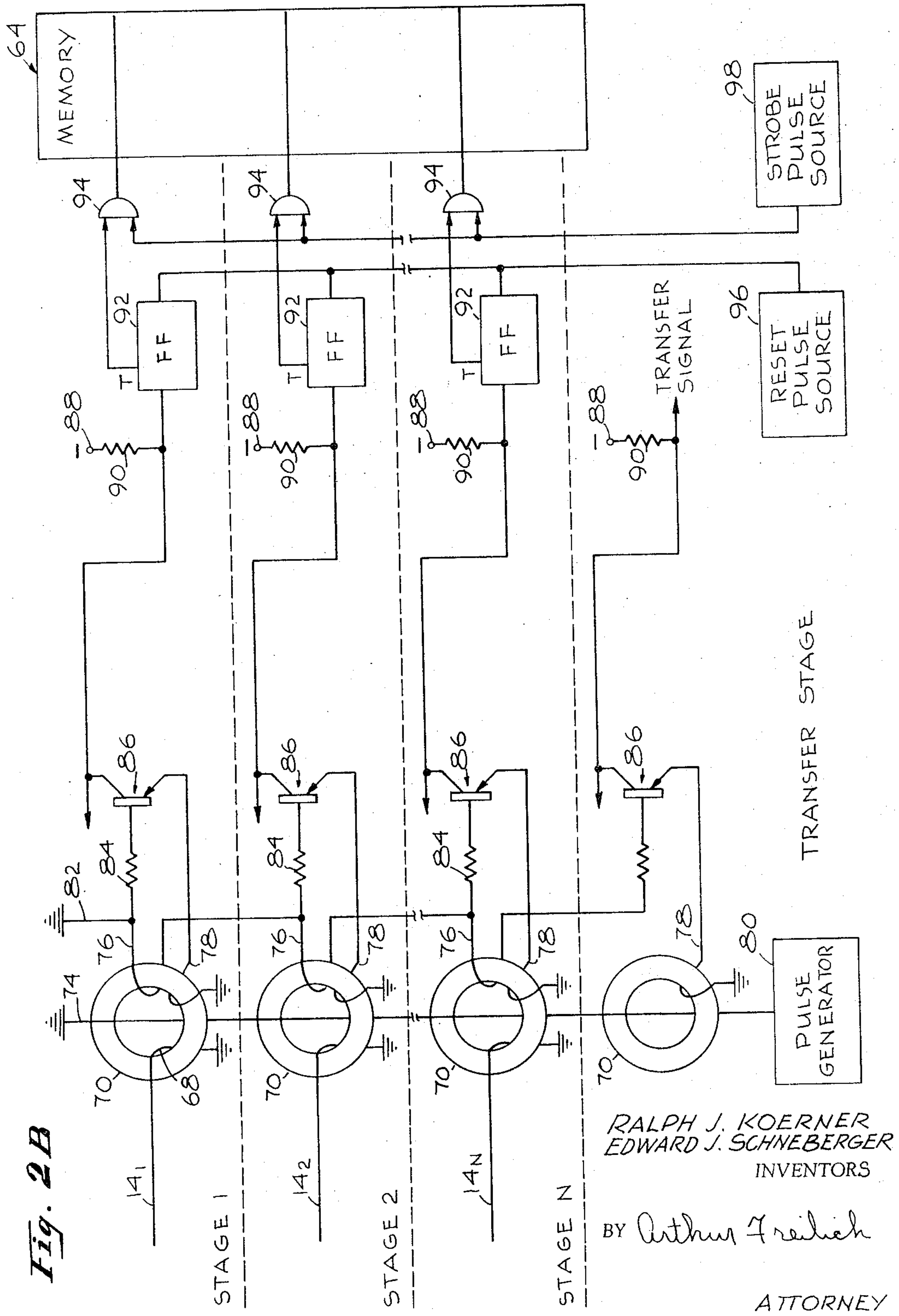

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIG. 1 is a schematic diagram of one form of a content addressable memory;

FIG. 2A is a schematic diagram of a first embodiment of a selection device constructed in accordance with the invention and utilizing electromechanical relays which finds utility in conjunction with a content addressable memory, as exemplified by the schematic diagram of FIG. 1; and FIG. 2B is a schematic diagram of a preferred embodiment of the invention utilizing magnetic and solid state elements in lieu of the electromechanical relays shown in FIG. 2A.

FIG. 1 schematically illustrates one form of a content addressable memory. A content addressable memory is distinguishable from most conventional memories by virtue of the fact that a location therein is selected on the basis of the contents stored in the location rather than on the basis of some arbitrarily assigned address code. That is, most conventional memories include a plurality of storage locations each of which can be identified by an appropriate address code. In such a conventional memory, information can be obtained from a particular location by applying signals representative of the address code to an appropriate decoding network which in turn functions to effect the elements of the particular storage location to permit the information stored in those elements to be read out to some type of sensing means. On the other hand, in a content addressable memory, each storage location is not identified by an address code. Instead, a desired bit pattern (search word) is specified and all of the storage locations in the memory are simultaneously searched to locate those locations, if any, which store an identical bit pattern. Information can then be read out from the located locations. Indeed, if desired, the content addressable memory can be utilized so that a different bit pattern is stored in each location so that these bit patterns can effectively be considered location addresses. However, the content addressable memory is much more flexible than conventional memories and need not essentially waste storage capacity to include in each location the address or tag of that location.

The exemplary content addressable memory of FIG. 1 has N storage locations, each location being capable of storing a word composed of three information bits, each bit being represented by the state of conventional set-reset flip-flop circuit. The true output terminal of each of the memory flip-flops is connected to the input of an AND gate 10 while the false output terminal is connected to the input of an AND gate 12. The outputs of the AND gates 10 and 12 associated with each memory flip-flop are connected together and applied to a word line 14. A different word line 14 is provided for each location in the memory and the word lines will be respectively designated by the numerals $\mathbf{14}_1$, associated with memory location 1 storing word 1, $\mathbf{14}_2$ associated with memory location 2, and $\mathbf{14}_N$ associated with memory location N. The AND gates 10 and 12 associated with the memory flip-flops representative of bits of the same word are connected to the same word line. That is, the AND gates connected to the flip-flops respectively representative of bit positions 1, 2, and 3 of word 1 are all connected to word line $\mathbf{14}_1$. The AND gates associated with the flip-flops of locations 2 and N are similarly connected to the word lines $\mathbf{14}_2$ and $\mathbf{14}_N$ respectively.

In addition to the memory location flip-flops, the memory includes a search register including one flip-flop for each bit position of the maximum length search word that can be utilized. The true output terminal of the flip-flop representing bit position 1 in the search register is connected to the input of an AND gate 16 while the false output terminal of the same flip-flop is connected to the input of an AND gate 18. The output line of a clock source 20 is also connected to the inputs of the AND gates 16 and 18. The output of AND gate 16 associated with bit position 1 of the search register is connected to the input of AND gate 12 connected to the flip-flops representing bit position 1 of each of the memory locations. Similarly, the output of AND gate 18 associated with bit position 1 of the search register is connected to the input of AND gates 10 connected to the flip-flops representing bit position 1 of the various memory locations. Similarly, the true and false output terminals of the flip-flops representing bit positions 2 and 3 of the search register are respectively connected through AND gates 16 and 18 to AND gates 12 and 10 connected to all of the flip-flops representing bit positions 2 and 3, respectively, of the various memory locations.

In order to understand the operation of the content addressable memory shown in FIG. 1, let it be initially assumed that each of the memory flip-flops stores the bit of information contained within the parentheses disposed within the boxes representative of the memory flip-flops; in addition, let it be assumed that the bits of the search word stored in the search register flip-flops are similarly represented by the numbers within the parentheses disposed within the boxes representative of the search register flip-flops. When a clock pulse is generated by the clock source 20, an output pulse will be developed on the output line of AND gate 18 of bit position 1 of the search register, inasmuch as the flip-flop connected thereto is in a false state. Note that this pulse will initiate no output signal from the AND gate 10 of bit position 1 of word locations 2 and N inasmuch as the flip-flops in each of these positions are in a false state. However, the pulse generated on the output line of AND gate 18 of bit position 1 will cause AND gate 10 of bit position 1 of memory location 1 to generate an output pulse on word line $14_1$, because that flip-flop is in a true state.

Simultaneously, a pulse will be generated on the output line of AND gate 16 of bit position 2 of the search register. The pulse so generated will not initiate output signals from AND gate 12 of bit position 2 of memory locations 2 and N but will, however, cause AND gate 12 of bit position 2 of word location 1 to generate a second pulse on the word line $14_1$. Simultaneously, a pulse will be generated on the output line of AND gate 18 of bit position 3 of the search register but, as should be apparent, this pulse will not cause any of the AND gates 10 or 12 to provide a pulse on any of the word lines. It is pointed out that although the pulses representative of bits 1, 2, 3 of the search word can be simultaneously generated, the invention herein is as equally applicable if they are sequentially generated.

Accordingly, it has been seen that, in the illustrated exemplary content addressable memory embodiment, the null (absence of a pulse) on word lines $14_2$ and $14_N$ indicates that the information bit pattern stored in the locations associated with these word lines is identical to or matches the information bit pattern (search word) stored in the search register. On the other hand, the pulses appearing on word line $14_1$ indicate that the bit pattern stored in location 1 does not match the search word. It is desirable to utilize the null on the word lines $14_2$ and $14_N$ to initiate further operations. For example, the three bits in each location illustrated in FIG. 1 may in fact comprise only three bits of a much longer word of, for example, thirty bits. In such a case, it may be desired to interpret the null on the word lines as a command to read out the additional twenty-seven bits of the word. Since very few, if any, memories permit information to be obtained from more than one location at a time, it is necessary that some selection device be provided for processing these null indications one at a time. In certain instances it may be desired to process the null indications sequentially while in other instances it may suffice to process only one of the null indications and ignore the others. For example, if the illustrated binary code 010 represented an available or empty location in memory, a search of the type previously described could be run merely to locate an empty location in which information could be stored. Having found one such location, it may be unnecessary to consider other locations specified by nulls in other word lines. On the other hand, the binary code 010 could, for example, represent the age classification of an employee and it may be desirable to cause other information to be read out from memory with regard to each employee falling within this age classification and as a consequence all null indications should be considered.

Attention is now called to FIG. 2A which illustrates a first embodiment of a selection device for selecting one of the word lines shown in FIG. 1, in the event that a null appears on one or more of the word lines. The selection means shown in FIG. 2A essentially consists of N stages, each respectively associated with one of the word lines of the content addressable memory shown in FIG. 1 and with a transfer stage. Since these stages are substantially identical, the description herein will be principally directed to stage 1, but it should be understood, unless otherwise noted, that it pertains to stages 2 through N also.

Word line $14_1$ is connected through a diode 21 to a first terminal of a relay coil 22 whose opposite terminal is connected to ground. Relay coil 22, when energized, operates to open relay switch 24 which then remains open until a second coil 26 is energized by a reset pulse source 27. Relay switch 24 is connected between a pulse generator 32 and a first terminal of a relay coil 34 whose second terminal is connected to ground. Relay coil 34, when energized, functions to open a normally-closed relay switch 36 and close normally open relay switch 38. Relay switch 36 is connected in a substantially zero-resistance path in parallel with a voltage source 40 having a potential nominally shown as being equal to 2 volts. The negative terminal of the voltage source 40 is connected to ground while the positive terminal thereof is connected to the negative terminal of its counterpart in stage 2. Similarly, the positive terminal of voltage source 40 of stage 2 is connected to the negative terminal of voltage source 40 of stage N. The positive terminal of the voltage source 40 of stage N is connected to the negative terminal of voltage source 40 of a transfer stage whose positive terminal is in turn connected through a resistor 42 to ground.

Relay switch 38 is connected between a terminal 37, to which a source of positive potential, nominally shown as +3 volts, is applied, and the anode of a diode 44. The cathode of diode 44 is connected to a first terminal of a relay coil 46 whose second terminal is connected to a tap 47 connected to the positive terminal of the voltage source 40 of stage 1. The relay coil 46 when energized acts to close a relay switch 48 which is connected in the stage output circuit between a positive potential source, connected to a terminal 49, and a first terminal of a resistor 50 whose second terminal is connected to ground. A relay switch 51 connects the first terminal of resistor 50 to an output line 52. The output line 52 is in turn connected through delay means 53 to the first terminal of a relay coil 54 whose second terminal is connected to ground. When energized, relay coil 54 acts to open relay switch 48. The output line 52 is in addition connected through delay means 53 and a diode 55 to the first terminal of relay coil 22. The relay switches 51 of each stage are normally open and are under the control of a relay coil 56 such that, when the relay coil 56 is energized by a strobe pulse source 58, all of the relay switches 51 will close.

The transfer stage is somewhat similar to stages 1, 2, and N inasmuch as it includes a diode 44 connected between a positive potential source, nominally shown as +3 volts, and the first terminal of a relay coil 46, whose second terminal is connected to a tap 47 connected to the positive terminal of voltage source 40 of the transfer stage. It is to be noted, however, that the transfer stage does not include a relay switch between the diode 44 and the positive potential source, does not have the path connected in parallel with voltage source 40, and does not have the relay coils 22, 26, 34 or relay switches 24, 36.

In the operation of the circuit of FIG. 2A let it be assumed, in accordance with the hypothetical search situation described in connection with FIG. 1, that a pulse was generated on the word line $14_1$ and nulls appeared on the word lines $14_2$ and $14_N$. As a consequence, the relay switch 24 of stage 1 will open while the corresponding relay switches of stages 2 and N will remain closed. Accordingly, when a pulse is generated by the pulse generator 32, both relay switches 36 of stages 2 and N will open while the relay switch 36 of stage 1 will remain closed. In addition, the relay switch 38 of stage 1 will remain open while the relay switches 38 of stages 2 and N will close. Thus, the circuit junction 47 of stage 1 will reside at ground potential, the circuit junction 47 of stage 2 will reside at +2 volts, and the circuit junction 47 of stage N will reside at +4 volts. No current, of course, will be conducted through the relay coil 46 of stage 1 since the relay switch 38 connected in series therewith remains open. On the other hand, current will be conducted through the diode 44 and relay coil 46 of stage 2 since the relay switch 38 in series therewith will be closed and the potential at circuit junction 47 will reside below the +3 volt potential applied to terminal 37 of stage 2. Current will not be conducted through the relay coil 46 of stage N, however, because even though the relay switch 38 connected in series therewith will be closed, the circuit junction 47 of stage N will reside at +4 volts thereby back-biasing the diode 44 of of stage N. Since only relay coil 46 of stage 2 will be energized, only relay switch 48 of stage 2 will be closed. By then permitting the strobe pulse source 58 to generate a strobe pulse, the relay coil 56 will be energized to thereby close all the relay switches 51. As a consequence, potential of output line 52 of only stage 2 will rise to the potential of the source connected to terminal 49. The potential applied to the output line 52 of stage 2 can be utilized e.g., to cause information to be read out from location 2 of a memory 64. In addition, the potential applied to output line 52 is coupled back through delay means 53 to open the relay switches 24 and 48.

After the relay switch 24 of stage 2 has been opened, a second pulse could be provided by the pulse generator 32 which then of course would function, by virtue of the sequence previously described, to close relay switch 48 of stage 3 to thereby permit a positive potential to be applied to output line 52 of stage N. As a consequence of relay switch 48 of stage N closing, and a pulse being thereafter generated by pulse source 58, relay switch 24 of stage N is caused to open thereby closing relay switch 36 of stage N so as to cause circuit junction 47 of the transfer stage to fall to +2 volts. Accordingly, current can then flow through diode 44 and relay coil 46 of the transfer stage to thereby close the associated relay switch 48. This action in turn applies the positive potential applied to terminal 49 to the transfer stage output line 52, which indicates that all of the output circuits associated with the word lines in FIG. 1 on which a null was detected have been selected.

It has been demonstrated how the selection device operates when all the voltage sources 40 are of equal value and all of the diodes 44 have their anodes connected to terminals 37 to which are connected voltage sources of equal value. Although it is most expedient to construct a circuit in this fashion, it is not essential to do so. That is, for example, the voltage sources 40 in stages 1 and 2 could have respective values of 2 volts and 4 volts. As a consequence, the anode of diode 44 of stage 2 could be connected to a 5 volt source so that the diode is forward-biased when junction 47 of stage 2 is at 4 volts and back-biased when the junction is at 6 volts. Additionally, it should of course be understood that the polarities of the diodes 44 could be reversed so long as an appropriate adjustment were made in the values of the voltage applied thereto.

Attention is now called to FIG. 2B which illustrates a preferred embodiment of the invention in which each of the word lines $14_1$, $14_2$, and $14_N$ is respectively connected to windings 68 which are respectively threaded through bistable elements comprising magnetic cores 70. Again, since the N stages of the selection means shown in FIG. 2B are substantially identical, only stage 1 will be described in detail.

In addition to the winding 68, each core 70 is threaded by a first drive winding 74 and first and second sense windings 76 and 78. The first drive winding 74 is threaded through the cores 70 of each of stages 1, 2, N and the transfer stage and is connected to a pulse generator 90. A pulse applied to the winding 74 by a pulse generator 80 has the effect of driving each of the cores to a second state of magnetic remanence. Similarly, a pulse applied to any of windings 68 drives the respective cores through which they are threaded to a second state of magnetic remanence.

The first sense windings 76 of each of stages 1, 2, and N are connected in series in an additive manner with the upper terminal on the first sense winding 76 of stage 1 being tied to terminal 82 which is connected to ground. The upper terminal of each of first sense windings 76 is connected through a resistor 84 to the base of a PNP transistor 86 whose emitter-collector path can be considered as the stage output circuit. One terminal of the second sense winding 78 is connected to ground while the second terminal of the winding is connected to the emitter of the transistor 86. The collector of the transistor 86 is connected to a negative potential source connected to terminal 88 through a resistor 90. In addition, the collector of the transistor 86 is connected to the set input terminal of a flip-flop 92 whose true output terminal is connected to the input of an AND gate 94. The reset terminal of the flip-flop 92 is connected to a reset pulse source 96. The second input terminal to AND gate 94 is connected to a strobe pulse source 98. The output of AND gate 94 can be associated with a word location in a memory 64.

The core 70 of the transfer stage is provided only with a second sense winding 78 which is connected to the emitter of the transistor 86 of the transfer stage. The base of the transistor 86 of the transfer stage is connected through resistor 84 to the lower terminal of winding 76 of stage N.

In order to explain the operation of the embodiment of FIG. 2B, again let it be assumed that a pulse is applied to the word line $14_1$ while nulls appear on the word lines $14_2$ and $14_N$. As a result, the core 70 of stage 1 will be switched to its second remanent state while the cores 70 of stages 2, N, and the transfer stage will remain in a first remanent state. As a consequence, when the pulse generator 80 applies a pulse to the first drive winding 74, the cores of stages 2 and N and the transfer stage will switch to the second remanent state thereby inducing a pulse of equal amplitude in each of the sense windings threaded therethrough. For the sake of simplicity, let it be assumed that the pulse so induced is equal to +2 volts. Accordingly, a +2 volt potential will be applied to the emitters of the transistors 86 of stages 2 and N and the transfer stage. The potential applied to the base of transistor 86 of stage 2 will remain at ground potential inasmuch as no potential will be induced in the first sense winding 76 of stage 1. On the other hand, a +2 volt potential will be applied to the base of transistor 86 of stage N and the equivalent of a +4 volt potential will be applied to the base of transistor 86 of the transfer stage. Accordingly, current will be initiated only in transistor 86 of stage 2 and, as a consequence, the voltage on the collector of the transistor 86 of the stage 2 will be driven to approximately ground potential to thereby switch flip-flop 92 of stage 2 to the true state. Subsequently generation of a strobe pulse by the strobe pulse source 98 will cause the AND gate 94 of stage 2 to apply a pulse to its output line to thereby select word location 2 in memory 64. By subsequently causing the reset pulse source 96 to generate a reset pulse, the flip-flop 92 of stage 2 is reset.

It is again pointed out that it is not essential, although it is convenient, that the sense biasing potentials be applied to all of the transistors 86 and the potentials can vary from stage to stage as suggested in the discussion of FIG. 2A.

If it is desired to sequentially select each of the word lines 14 upon which a null appears, the increase in the potential of collector 86 can be utilized to temporarily modify the information in the content addressable memory of FIG. 1 so that a subsequent search can be conducted which will then ignore the previously selected word line. More particularly, by connecting the collector of each transistor 86 of stages 1, 2, and N of FIG. 2B to the input terminal of the memory flip-flops representative of bit three of each content addressable memory location so that the increase in collector potential switches the bit 3 memory flip-flop to 1, a second memory search for the same search word, i.e. 010, as previously discussed would result in a null appearing only on word line $14_N$. In this manner, the word lines on which nulls appear can be sequentially selected. In the event none of the cores 70 of stages 1, 2, and N remain in the first remanent state after a search has been conducted, the generator of a pulse by pulse generator 80 will initiate conduction in transistor 86 of the transfer stage which will thereby cause the potential on the collector thereof to rise to ground potential. This of course can be interpreted as indicating that either all of the word lines on which nulls appeared have already been selected or that nulls did not appear on any of the word lines.

From the foregoing, it should be apparent that a novel selection device has been disclosed herein for selecting one of a plurality of bistable elements in a given state. More particularly, it should be apparent that the selection means provided herein represents a considerable improvement over a conventional commutation techniques inasmuch as it has been shown that M bistable elements in a given state, of a possible total number of N such elements, can be selected in M finite time periods, as distinguished from the N such periods which would be required if conventional commutation techniques were employed.

Although two specific embodiments of the invention have been illustrated herein, it should be understood that the invention should not be limited to the specific structural details shown since it is recognized that certain structural alternative may be readily apparent to those skilled in the art. For example only, in the embodiment of FIG. 2A, the signals applied to bias diodes 44 can be generated by the use of a resistive voltage divider network rather than the individual voltage source shown and, in FIG. 2B, a thyristor element can be substituted for the combination of a transistor and a flip-flop.

The embodiment of the invention in which an exclusive property or privilege is claimed are defined as follows:

1. For use with a plurality of binary elements, respectively arbitrarily numbered 1, 2, 3, . . . N, each of which is able to independently assume either a first or second state, selection means for selecting the lowest numbered element in said first state comprising:

means associated with each of said binary elements for providing first value manifestations;

means for incrementally developing the sum of each of said first value manifestations associated with said elements in said first state;

a plurality of output circuits each of which is associated with a different one of said binary elements;

means for applying each incremental step value manifestation of said sum to a different one of said output circuits; and means for biasing each of said output circuits for causing a unique response to be initiated only in the output circuit associated with the lowest numbered element.

2. For use with a plurality of binary elements, respectively arbitrarily numbered 1, 2, 3, . . . N, each of which is able to independently assume either a first or second state, selection means for selecting the lowest numbered element in said first state comprising:

means associated with each of said binary elements for providing equal valued physical manifestations;

means for incrementally developing the sum of each of said manifestations associated with said elements in said first state;

a plurality of output circuits each of which is associated with a different one of said binary elements;

means for applying the lowest incremental step value manifestation of said sum to the output circuits associated with said lowest numbered element and each succeedingly higher step value manifestation of said sum to the output circuits associated with each succeedingly higher numbered element, respectively; and means for biasing each of said output circuits for causing a unique response to be initiated only in the output circuit to which the lowest incremental step value manifestation is applied.

3. For use with a plurality of binary elements, respectively arbitrarily numbered 1, 2, 3, . . . N, each of which is able to independently assume either a first or second state, selection means for selecting the lowest numbered element in said first state comprising:

a plurality of voltage sources each of which is uniquely associated with a different one of said binary elements;

means connecting each of the voltage sources associated with a binary element in said first state, in a series circuit in an additive manner;

a plurality of taps each of which is connected to a corresponding terminal of a different voltage source in said series circuit whereby each of said taps resides at a different voltage level;

a plurality of output circuits each of which is associated with a different one of said binary elements;

means connecting each of said taps to a different one of said ouptut circuits; and means biasing each of said output circuits for causing a unique response to be initiated only in the output circuit associated with a binary element in said first state connected to the tap residing at a unique one of said voltage levels.

4. For use with a plurality of binary elements, respectively arbitrarily numbered 1, 2, 3, . . . N, each of which is able to independently assume either a first or second state, selection means for selecting the lowest numbered element in said first state comprising:

a plurality of voltage sources each of which is uniquely associated with a different one of said binary elements;

means connecting each of said voltage sources in a series circuit in an additive manner;

means establishing a substantially no voltage drop path in parallel with each of said voltage sources associated with a binary element in said second state;

a plurality of taps each of which is connected to a corresponding terminal of a different voltage source in said series circuit whereby said taps can reside at different voltage levels;

a plurality of output circuits each of which is associated with a different one of said binary elements;

means in each of said output circuits for preventing current conduction therein in response to the binary element associated therewith being in said second state;

means connecting each of said taps to a different one of said output circuits; and means biasing each of said output circuits for initiating current in the output circuit associated with a binary element in said first state and connected to the one of said taps residing at the lowest of said different voltage levels.

5. The selection means of claim 4 wherein said voltage sources are all of equal amplitude.

6. A content addressable memory system comprising:

a memory having a plurality of storage locations respectively arbitrarily numbered 1, 2, 3, . . . N each capable of storing a word and each having a word line associated therewith;

a register storing a search word;

means generating a pulse on each word line associated with a stored word not identical to said search word;

a plurality of binary elements each capable of independently assuming either a first or second state and each of which is connected to a different one of said word lines;

each of said binary elements being responsive to a pulse on its connected word line to assume a second state;

selection means for selecting the binary element associated with the lowest numbered storage location assuming a first state; said selection means including means associated with each of said binary elements for providing first value manifestations;

means for incrementally developing the sum of each of said first value manifestations associated with said elements in said first state;

a plurality of output circuits each of which is associated with a different one of said binary elements;

means for applying each incremental step value manifestation of said sum to a different one of said output circuits; and means for biasing each of said output circuits for causing a unique response to be initiated only in the output circuit associated with the lowest numbered element.

7. A content addressable memory system comprising:

a memory having a plurality of storage locations respectively arbitrarily numbered 1, 2, 3, . . . N each capable of storing a word and each having a word line associated therewith;

a register storing a search word;

means generating a pulse on each word line associated with a stored word not identical to said search word;

a plurality of binary elements each capable of independently assuming either a first or second state and each of which is connected to a different one of said word lines;

each of said binary elements responsive to a pulse on its connected word line to assume a second state;

selection means for selecting the binary element associated with the lowest numbered storage location assuming a first state; said selection means including means associated with each of said binary elements for providing equal value physical manifestations;

means for incrementally developing the sum of each of said manifestations associated with said elements in said first state;

a plurality of output circuits each of which is associated with a different one of said binary elements;

means for applying the lowest incremental step value manifestation of said sum to the output circuit associated with the lowest numbered storage location and each succeedingly higher step value manifestation of said sum to the output circuits associated with each succeedingly higher numbered storage location, respectively; and means for biasing each of said output circuits for causing a unique response to be initiated only in the output circuit to which the lowest incremental step value manifestation is applied.

8. A content addressable memory system comprising:

a memory having a plurality of storage locations respectively arbitrarily numbered 1, 2, 3 . . . N each capable of storing a word and each having a word line associated therewith;

a register storing a search word;

means generating a pulse on each word line associated with a stored word not identical to said search word;

a plurality of binary elements each capable of independently assuming either a first or second state and each of which is connected to a different one of said word lines;

each of said binary elements responsive to a pulse on its connected word line to assume a second state;

selection means for selecting the binary element associated with the lowest numbered storage location assuming a first state; said selection means including a plurality of voltage sources each of which is uniquely associated with a different one of said binary elements;

means connecting each of the voltage sources associated with a binary element in said first state, in a series circuit in an additive manner;

a plurality of taps each of which is connected to a corresponding terminal of a different voltage source in said series circuit whereby each of said taps resides at a different voltage level;

a plurality of output circuits each of which is associated with a different one of said binary elements;

means connecting each of said taps to a different one of said output circuits; and means biasing each of said output circuits for causing a unique response to be initiated only in the output circuit associated with a binary element in said first state connected to the tap residing at a unique one of said voltage levels.

9. A content addressable memory system comprising:

a memory having a plurality of storage locations respectively arbitrarily numbered 1, 2, 3 . . . N each capable of storing a word and each having a word line associated therewith;

a register storing a search word;

means generating a pulse on each word line associated with a stored word not identical to said search word;

a plurality of binary elements each capable of independently assuming either a first or second state and each of which is connected to a different one of said word lines;

each of said binary elements responsive to a pulse on its connected word line to assume a second state;

selection means for selecting the binary element associated with the lowest numbered storage location assuming a first state; said selection means including a plurality of equal amplitude voltage sources each of which is uniquely associated with a different one of said binary elements;

means connecting each of said voltage sources in a series circuit in an additive manner;

means establishing a substantially no voltage drop path in parallel with each of said voltage sources associated with a binary element in said second state;

a plurality of taps each of which is connected to a corresponding terminal of a different voltage source in said series circuit whereby said taps can reside at different voltage levels;

a plurality of output circuits each of which is associated with a different one of said binary elements;

means in each of said output circuits for preventing current conduction therein in response to the binary element associated therewith being in said second state;

means connecting each of said taps to a different one of said output circuits; and means biasing each of said output circuits for initiating current in the output circuit associated with a binary element in said first state and connected to the one of said taps residing at the lowest of said different voltage levels.

10. In combination with a plurality of binary elements each capable of assuming either a first or second state and each respectively arbitrarily numbered 1, 2, 3, . . . N, each element having a different output circuit associated therewith, selection means for initiating current in the output circuit associated with the lowest numbered element assuming said first state, said selection means comprising:

means for generating an equal amplitude voltage signal for each of said binary elements assuming said first state;

means for incrementally developing the sum of said voltage signals;

means for applying the lowest incremental step value of said sum to the output circuit associated with said lowest numbered binary element and each other incremental step value to a different one of said output circuits; and means for biasing each of said output circuits for initiating current only in the unique output circuit to which is applied said lowest incremental step value and which is associated with a binary element assuming said first state.

11. In combination with a plurality of magnetic cores each capable of assuming either a first or second remanent state and each respectively arbitrarily numbered 1, 2, 3 . . . N, each core having an output circuit associated therewith, selection means for initiating current in the output circuit associated with the lowest numbered core assuming said first state, said selection means comprising:

a drive winding threaded through each of said cores;
pulse generator means connected to said drive winding for applying a pulse to said drive winding to cause each of said cores to switch to said second state;
a plurality of first sense windings each of which is threaded through a different one of said cores;
a plurality of second sense windings each of which is threaded through a different one of said cores;
means connecting said first sense windings in series in an additive manner;
a plurality of taps each of which is connected to a like terminal of a different one of said first sense windings;
means connecting each of said taps to the output circuit associated with the core to whose first sense winding the particular tap is connected;
means connecting each of said second sense windings to the output circuit associated with the core through which each is threaded; and
means biasing each of said output circuits for initiating current in one of said output circuits in response to the coincidence of a unique voltage level established at the tap connected thereto and a voltage induced in the second sense winding connected thereto.

12. The combination of claim 11 wherein said output circuit includes a transistor and said tap and said second sense winding are respectively connected to the base and emitter thereof.

13. A content addressable memory system comprising:
a memory having a plurality of storage locations respectively arbitrarily numbered 1, 2, 3 . . . N each capable of storing a word and each having a word line associated therewith;
a register storing a search word;
means generating a pulse on each word line associated with a stored word not identical to said search word;
a plurality of magnetic cores each capable of assuming first and second states and each having first and second drive windings and first and second sense windings threaded therein;
a pulse generator;
means connecting all of said first drive windings together and to said pulse generator for causing each of said cores to switch to said second state in response to generation of a pulse by said pulse generator;
means connecting each of said second drive windings to a different one of said word lines for causing the respective cores to switch to said second state in response to a pulse on said word lines;
means connecting said first sense windings in series in an additive manner;
a plurality of taps each of which is connected to a like terminal of a different one of said first sense windings;
a plurality of output circuits each of which is associated with a different one of said cores;
means connecting each of said taps to the output circuit associated with the core to whose first sense winding the particular tap is connected;
means connecting each of said second sense windings to the output circuit associated with the core through which each is threaded; and
means biasing each of said output circuits for initiating current in one of said output circuits in response to the coincidence of a unique voltage level established at the tap connected thereto and a voltage induced in the second sense winding connected thereto.

14. The combination of claim 13 wherein said output circuit includes a transistor and said tap and said second sense winding are respectively connected to the base and emitter thereof.

15. In combination with a plurality of binary elements each capable of assuming either a first or second state and each respectively arbitrarily numbered 1, 2, 3 . . . N, each element having a different output circuit associated therewith, selection means for sequentially initiating current in each of the M output circuits assuming said first state, said selection means comprising:
means for generating an equal amplitude voltage signal for each of said binary elements assuming said first state;
means for incrementally developing the sum of said voltage signals;
means for applying the lowest incremental step value of said sum to the output circuit associated with said lowest numbered binary element and each other incremental step value to a different one of said output circuits;
means for biasing each of said output circuits for initiating current only in the unique output circuit to which is applied said lowest incremental step value and which is associated with a binary element assuming said first state; and
means responsive to the initiation of current in said unique output circuit for switching the binary element associated therewith to said second state.

16. A content addressable memory system comprising:
a memory having a plurality of storage locations respectively arbitrarily numbered 1, 2, 3 . . . N, each capable of storing a word and each having a word line associated therewith;
a register storing a search word;
means generating a pulse on each word line associated with a stored word not identical to said search word;
a plurality of magnetic cores each capable of assuming first and second states and each having first and second drive windings and first and second sense windings threaded therein;
a pulse generator;
means connecting all of said first drive windings together and to said pulse generator for causing each of said cores to switch to said second state in response to generation of a pulse by said pulse generator;
means connecting each of said second drive windings to a different one of said word lines for causing the respective cores to switch to said second state in response to a pulse on said word lines;
means connecting said first sense windings in series in an additive manner;
a plurality of taps each of which is connected to a like terminal of a different one of said first sense windings;
a plurality of output circuits each of which is associated with a different one of said cores;
means connecting each of said taps to the output circuit associated with the core to whose first sense winding the particular tap is connected;
means connecting each of said second sense windings to the output circuit associated with the core through which each is threaded;
means biasing each of said output circuits for initiating current in one of said output circuits in response to the coincidence of a unique voltage level established at the tap connected thereto and a voltage induced in the second sense winding connected thereto; and means responsive to the initiation of current in said one output circuit for modifying the word stored in the storage location associated with said output circuit.

17. In combination with a plurality of conductors on which binary signals can randomly appear, the conductors being respectively arbitrarily numbered 1, 2, 3 . . . N, a device for monitoring the conductors for selecting the lowest numbered conductor on which a given binary signal does appear, said device comprising:

a plurality of binary elements each of which is associated with a different one of said conductors and responsive to the appearance of said given binary signal thereon for assuming a first state;

a plurality of output circuits each of which is associated with a different one of said conductors;

means for generating an equal amplitude voltage signal for each of said binary elements assuming said first state;

means for incrementally developing the sum of said voltage signals;

means for applying the lowest incremental step value of said sum to the output circuit associated with said lowest numbered conductor and each other incremental step value to a different one of said output circuits; and means for biasing each of said output circuits for initiating current only in the unique output circuit to which is applied said lowest incremental step value and which is associated with a conductor on which said given binary signal appeared.

18. For use with a plurality of binary elements, respectively arbitrarily numbered 1, 2, 3 . . . N, each of which is able to independently assume either a first or second state, selection means for selecting the lowest numbered element in said first state comprising:

a plurality of output circuits;

means connecting each of said binary elements to a different one of said output circuits for causing each output circuit to normally provide an output signal in response to switching of the binary element connected thereto;

means responsive to the initiation of switching in any one of said binary elements for inhibiting the provision of an output signal by any output circuit connected to a higher numbered binary element; and means coupling a signal to all of said binary elements for switching said elements to said second state.

References Cited by the Examiner

UNITED STATES PATENTS

| | | | |
|---|---|---|---|
| 3,030,609 | 4/1962 | Albrecht ---------- | 340—172.5 |
| 3,239,818 | 3/1966 | Petersen et al. ------ | 340—172.5 |
| 3,249,921 | 5/1966 | Seeber ------------ | 340—172.5 |

JAMES W. MOFFITT, *Acting Primary Examiner.*

S. URYNOWICZ, *Assistant Examiner.*